US007433169B2

(12) United States Patent
Kamel et al.

(10) Patent No.: US 7,433,169 B2
(45) Date of Patent: Oct. 7, 2008

(54) OVERVOLTAGE PROTECTION DEVICES INCLUDING WAFER OF VARISTOR MATERIAL

(75) Inventors: Sherif I. Kamel, Cary, NC (US); Zafiris Politis, Attiki (GR); Konstantinos Samaras, Athens (GR)

(73) Assignee: Raycap Corporation, Athens (GR)

( * ) Notice: Subject to any disclaimer, the term of this patent is extended or adjusted under 35 U.S.C. 154(b) by 290 days.

(21) Appl. No.: 11/301,000

(22) Filed: Dec. 15, 2005

(65) Prior Publication Data

US 2007/0139850 A1 Jun. 21, 2007

(51) Int. Cl.
*H02H 1/00* (2006.01)

(52) U.S. Cl. ...................................................... 361/127

(58) Field of Classification Search .................. 361/127
See application file for complete search history.

(56) References Cited

U.S. PATENT DOCUMENTS

| | | | | |
|---|---|---|---|---|
| 2,158,959 | A | | 5/1939 | Horikoshi |
| 2,311,758 | A | | 2/1943 | Johansson |
| 2,971,132 | A | | 2/1961 | Nash |
| 3,249,719 | A | | 5/1966 | Misare et al. |
| 3,813,577 | A | | 5/1974 | Kawiecke |
| 4,015,228 | A | | 3/1977 | Eda et al. |
| 4,085,397 | A | * | 4/1978 | Yagher, Jr. .................. 337/407 |
| 4,092,694 | A | | 5/1978 | Stetson |
| 4,240,124 | A | | 12/1980 | Westrom |
| 4,241,374 | A | | 12/1980 | Gilberts |
| 4,288,833 | A | | 9/1981 | Howell |
| 4,425,017 | A | | 1/1984 | Chan |
| 4,493,003 | A | | 1/1985 | Mickelson et al. |
| 4,595,635 | A | | 6/1986 | Dubrow et al. |
| 4,600,261 | A | | 7/1986 | Debbaut |
| 4,701,574 | A | | 10/1987 | Shimirak et al. |
| 5,172,296 | A | | 12/1992 | Kaczmarek |
| 5,311,164 | A | | 5/1994 | Ikeda et al. |
| 5,519,564 | A | | 5/1996 | Carpenter, Jr. |
| 5,529,508 | A | | 6/1996 | Chiotis et al. |
| 5,549,564 | A | | 8/1996 | Yoon |
| 5,588,856 | A | | 12/1996 | Collins et al. |
| 5,652,690 | A | | 7/1997 | Mansfield et al. |
| 5,721,664 | A | | 2/1998 | Uken et al. |

(Continued)

FOREIGN PATENT DOCUMENTS

| | | |
|---|---|---|
| DE | 3428258 | 2/1986 |

(Continued)

OTHER PUBLICATIONS

European Search Report, European Patent Application No. 06255633.7, mailed Apr. 16, 2007 (6 pages).

(Continued)

*Primary Examiner*—Michael J Sherry
*Assistant Examiner*—Tien Mai
(74) *Attorney, Agent, or Firm*—Myers Bigel Sibley & Sajovec, PA

(57) ABSTRACT

An overvoltage protection device includes first and second electrically conductive electrode members, a varistor member formed of a varistor material and electrically connected with each of the first and second electrode members, and an electrically conductive, meltable member. The meltable member is responsive to heat in the device to melt and form a current flow path between the first and second electrode members through the meltable member.

31 Claims, 5 Drawing Sheets

U.S. PATENT DOCUMENTS

| | | | | |
|---|---|---|---|---|
| 5,808,850 | A | 9/1998 | Carpenter, Jr. | |
| 5,936,824 | A | 8/1999 | Carpenter, Jr. | |
| 6,038,119 | A | 3/2000 | Atkins et al. | |
| 6,175,480 | B1 | 1/2001 | Karmazyn | |
| 6,430,019 | B1 | 8/2002 | Martenson et al. | |
| 6,430,020 | B1 * | 8/2002 | Atkins et al. | 361/127 |
| 2002/0018331 | A1 | 2/2002 | Talahashi | |

FOREIGN PATENT DOCUMENTS

| | | |
|---|---|---|
| DE | 198 23 446 A1 | 11/1999 |
| EP | 0 108 518 | 5/1984 |
| EP | 0 203 737 | 12/1986 |
| EP | 0 335 479 | 10/1989 |
| EP | 0 445 054 | 9/1991 |
| WO | WO 88/00603 | 1/1988 |
| WO | WO 90/05401 | 5/1990 |
| WO | WO 95/15600 | 6/1995 |
| WO | WO 95/24756 | 9/1995 |
| WO | WO 98/38653 | 9/1998 |
| WO | WO 97/42693 | 11/1999 |

OTHER PUBLICATIONS

Data Book Library 1997 Passive Components, Siemens Matsushita Components, 1997, pp. 15-17, 26-32, 36-37, 39, 161, 161, 167, 169, 171-174.

Raycap “Rayvoss™ Tramsient Voltage Surge Supprression System” webpage <http://www.raycap.com/surge/rayvoss.htm> accessed on Nov. 29, 2005, 1 page (undated).

Raycap “Revolutionary Lightning Protection Technology” Raycap Corporation Press Release, webpage <http://www.raycap.com/news/020930.htm> accessed on Nov. 29, 2005, 1 page (undated).

Raycap “The Ultimate Overvoltage Protection: Rayvoss™” brochure, 4 pages (undated).

Rayvoss™ “The Ultimate Overvoltage Protection” webpage <http://www.rayvoss.com> accessed on Nov. 29, 2005, 2 pages, (undated).

Rayvoss™ “Applications” webpage <http://www.rayvoss.com/applications.htm> accessed on Nov. 29, 2005, 4 pages, (undated).

Rayvoss™ “Frequently Asked Questions” webpage <http://www.rayvoss.com/faq.htm> accessed on Nov. 29, 2005, 2 pages, (undated).

Rayvoss™ “Technical Information” webpage <http://www.rayvoss.com/tech_info.htm> accessed on Nov. 29, 2005, 3 pages, (undated).

Written Opinion for International application No. PCT/US99/21899 on Jun. 21, 2000.

* cited by examiner

OVERVOLTAGE PROTECTION DEVICES INCLUDING WAFER OF VARISTOR MATERIAL

FIELD OF THE INVENTION

The present invention relates to voltage surge protection devices and, more particularly, to a voltage surge protection device including a wafer of varistor material.

BACKGROUND OF THE INVENTION

Frequently, excessive voltage is applied across service lines that deliver power to residences and commercial and institutional facilities. Such excess voltage or voltage spikes may result from lightning strikes, for example. The voltage surges are of particular concern in telecommunications distribution centers, hospitals and other facilities where equipment damage caused by voltage surges and resulting down time may be very costly.

Typically, one or more varistors (i.e., voltage dependent resistors) are used to protect a facility from voltage surges. Generally, the varistor is connected directly across an AC input and in parallel with the protected circuit. The varistor has a characteristic clamping voltage such that, responsive to a voltage increase beyond a prescribed voltage, the varistor forms a low resistance shunt path for the overvoltage current that reduces the potential for damage to the sensitive components. Typically, a line fuse may be provided in the protective circuit and this line fuse may be blown or weakened by the surge current or the failure of the varistor element.

Varistors have been constructed according to several designs for different applications. For heavy-duty applications (e.g., surge current capability in the range of from about 60 to 200 kA) such as protection of telecommunications facilities, block varistors are commonly employed. A block varistor typically includes a disk-shaped varistor element potted in a plastic housing. The varistor disk is formed by pressure casting a metal oxide material, such as zinc oxide, or other suitable material such as silicon carbide. Copper, or other electrically conductive material, is flame sprayed onto the opposed surfaces of the disk. Ring-shaped electrodes are bonded to the coated opposed surfaces and the disk and electrode assembly is enclosed within the plastic housing. Examples of such block varistors include Product No. SIOV-B860K250, available from Siemens Matsushita Components GmbH & Co. KG and Product No. V271BA60, available from Harris Corporation.

Another varistor design includes a high-energy varistor disk housed in a disk diode case. The diode case has opposed electrode plates and the varistor disk is positioned therebetween. One or both of the electrodes include a spring member disposed between the electrode plate and the varistor disk to hold the varistor disk in place. The spring member or members provide only a relatively small area of contact with the varistor disk.

Another type of overvoltage protection device employing a varistor wafer is the Strikesorb™ surge protection module available from Raycap Corporation of Greece, which may form a part of a Rayvoss™ transient voltage surge suppression system.

SUMMARY OF THE INVENTION

In various embodiments, the present invention is directed to an overvoltage protection device which may provide a number of advantages for safely, durably and consistently handling extreme, repeated, and/or end of life overvoltage conditions.

According to embodiments of the present invention, an overvoltage protection device includes first and second electrically conductive electrode members, a varistor member formed of a varistor material and electrically connected with each of the first and second electrode members, and an electrically conductive, meltable member. The meltable member is responsive to heat in the device to melt and form a current flow path between the first and second electrode members through the meltable member.

According to some embodiments, the current flow path formed by the meltable member extends fully from the first electrode member to the second electrode member with the meltable member engaging each of the first and second electrode members.

The meltable member may be formed of metal. According to some embodiments, the meltable member has a melting point in the range of from about 110 to 160° C.

According to some embodiments, the first electrode member includes a housing defining a chamber and the meltable member and at least a portion of the second electrode member are disposed in the chamber. According to some embodiments, the meltable member is mounted on the portion of the second electrode member in the chamber.

According to some embodiments, an electrically conductive reinforcing member is disposed in the chamber between the first and second electrode members, the reinforcing member is formed of a material having a higher melting point than a material of the housing, and the reinforcing member is positioned to receive electrical arcing from the second electrode member. The chamber may be sealed. According to some embodiments, an electrically insulating member is disposed in the chamber and interposed between the first and second electrode members.

According to some embodiments of the present invention, an overvoltage protection device includes a varistor member formed of a varistor material and an electrically conductive, meltable member. The device is adapted to direct a current through the varistor member responsive to an overvoltage event. The meltable member is responsive to heat in the device to melt and form a new current flow path in the device to inhibit at least some electrically induced heating of the device. According to some embodiments, the new current flow path directs current away from the varistor member.

According to method embodiments of the present invention, a method for providing overvoltage protection includes providing an overvoltage protection device including first and second electrically conductive electrode members, a varistor member formed of a varistor material and electrically connected with each of the first and second electrode members, and an electrically conductive, meltable member. The method further includes, responsive to heat in the device, melting the meltable member to form a current flow path between the first and second electrode members through the meltable member.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

The accompanying drawings which form a part of the specification, illustrate key embodiments of the present invention. The drawings and description together serve to fully explain the invention. In the drawings.

DETAILED DESCRIPTION OF EMBODIMENTS OF THE INVENTION

Figure 1:
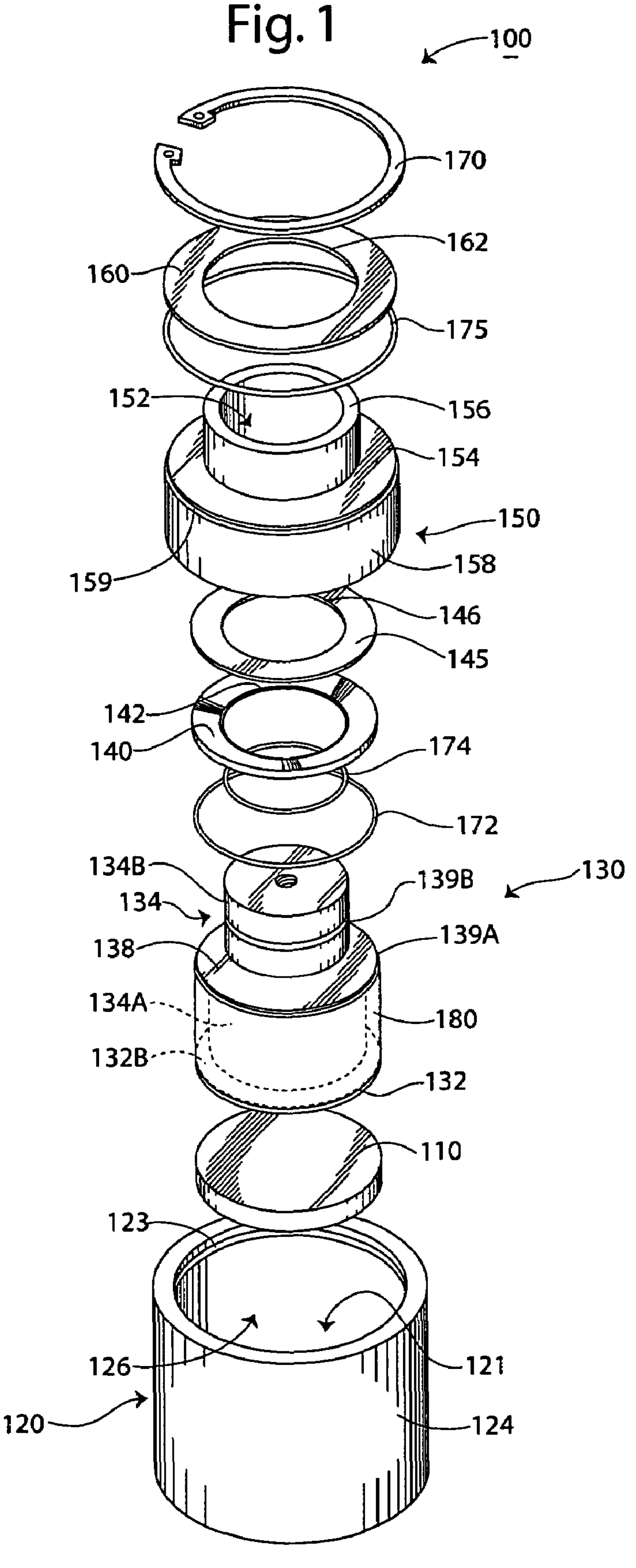
FIG. 1 is an exploded, perspective view of an overvoltage protection device according to embodiments of the present invention.
Figure 2:
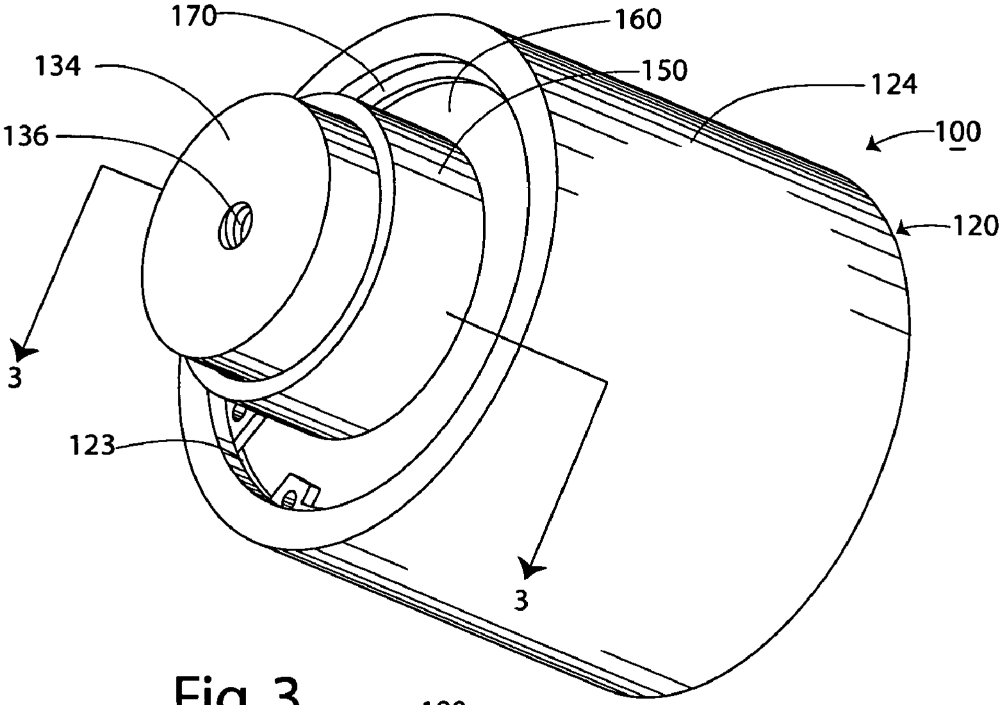
FIG. 2 is a top perspective view of the overvoltage protection device of FIG. 1.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "wafer" means a substrate having a thickness which is relatively small compared to its diameter, length or width dimensions.

Figure 3:
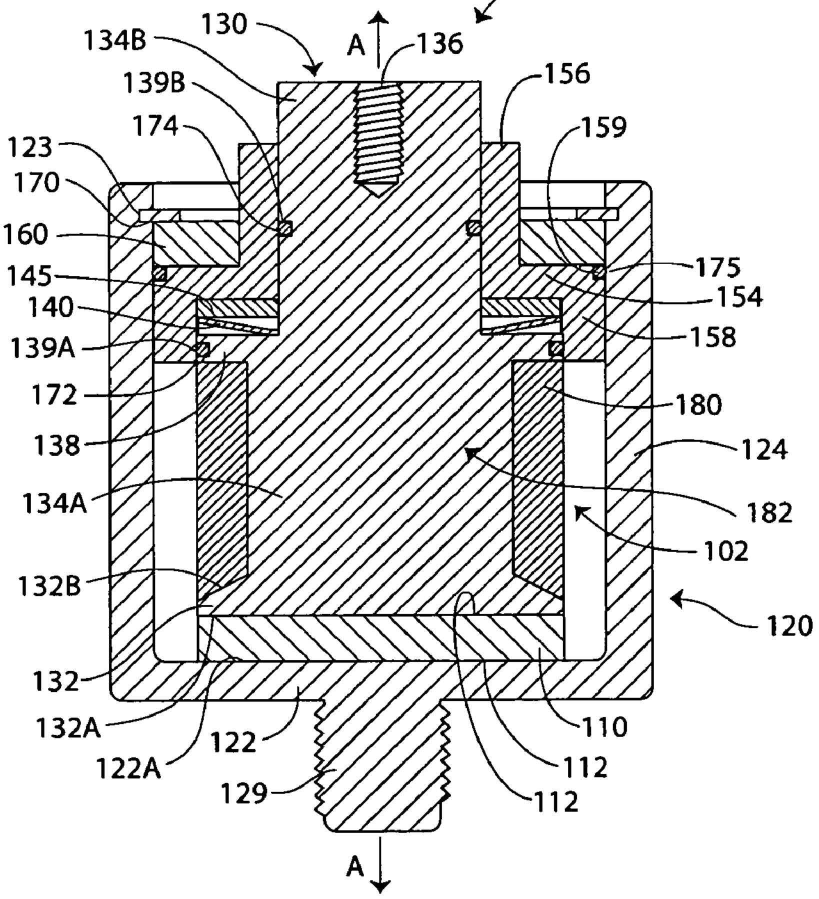
FIG. 3 is a cross-sectional view of the overvoltage protection device of FIG. 1 taken along the line 3-3 of FIG. 2.

With reference to FIGS. 1-5, an overvoltage protection device according to a first embodiment of the present invention is shown therein and designated 100. The device 100 has a lengthwise axis A-A (FIG. 3). The device 100 includes a housing 120, a piston-shaped electrode 130, and a wafer of varistor material 110 and other components as discussed in more detail below. The housing has an end electrode wall 122 (FIG. 3) and a cylindrical sidewall 124 extending from the electrode wall 122. The sidewall 124 and the electrode wall 122 form a chamber or cavity 121 communicating with an opening 126. A threaded post or stud 129 (FIG. 3) extends outwardly from housing 120. The electrode 130 has a head 132 disposed in the cavity 121 and an integral shaft 134 that projects outwardly through the opening 126. The varistor wafer 110 is disposed in the cavity 121 between and in contact with each of the electrode wall 122 and the head 132. The device 100 further includes an electrically conductive meltable member 180 adapted to prevent or inhibit overheating or thermal runaway of the device, as discussed in more detail below.

In use, the device 100 may be connected directly across an AC or DC input (for example, in an electrical service utility box). Service lines are connected directly or indirectly to each of the electrode shaft 134 and the housing post 129 such that an electrical flow path is provided through the electrode 130, the varistor wafer 110, the housing electrode wall 122 and the housing post 129. In the absence of an overvoltage condition, the varistor wafer 110 provides high electrical resistance such that no significant current flows through the device 100 as it appears electrically as an open circuit. In the event of an overvoltage condition (relative to the design voltage of the device), the resistance of the varistor wafer decreases rapidly, allowing current to flow through the device 100 and create a shunt path for current flow to protect other components of an associated electrical system. The general use and application of overvoltage protectors such as varistor devices is well known to those of skill in the art and, accordingly, will not be further detailed herein.

Turning to the construction of the device 100 in greater detail, the device 100 further includes a spring washer 140, a flat washer 145, an insulator ring 150, an end cap 160, a clip 170, and O-rings 172, 174, 175 disposed in the cavity 121. Each of these components is described more fully below.

The electrode wall 122 of the housing 120 has an inwardly facing, substantially planar contact surface 122A. An annular slot 123 is formed in the inner surface of the sidewall 124. According to some embodiments, the housing 120 is formed of aluminum. However, any suitable electrically conductive metal may be used. According to some embodiments, the housing 120 is unitary. The housing 120 as illustrated is cylindrically shaped, but may be shaped differently.

As best seen in FIG. 3, the head 132 of the electrode 130 has a substantially planar contact surface 132A that faces the contact surface 122A of the electrode wall 122. The top surface 132B of the head 130 is chamfered or tapered (i.e., sloped radially) outwardly and downwardly from a lower shaft portion 134A. The lower shaft portion 134A has a reduced diameter as compared to the diameter of the head 132. An upper shaft portion 134B extends from the upper end of the lower shaft portion 134A. The upper shaft portion 134B has a reduced diameter as compared to the diameter of the lower shaft portion 134A. According to some embodiments, the shaft portion 134B has a diameter of from about 1 to 1.5 inch. An integral, annular, intermediate flange 138 extends radially outwardly from the shaft 134 between the shaft portions 134A, 134B. An annular, sidewardly opening groove 139A is defined in the peripheral sidewall of the flange 138. Another annular, sidewardly opening groove 139B is defined in the upper shaft portion 134B. A threaded bore 136 is formed in the end of the shaft 134 to receive a bolt for securing a bus bar or other electrical connector to the electrode 130. According to some embodiments, the electrode 130 is formed of aluminum. However, any suitable electrically conductive metal may be used.

The meltable member 180 is mounted on the electrode 130. The meltable member 180 is a cylindrical, tubular piece or sleeve surrounding the lower shaft portion 134A, which is disposed in a central passage of the meltable member 180. According to some embodiments, the meltable member 180 contacts the lower shaft portion 134A and, according to some embodiments, the meltable member 180 contacts the lower shaft portion 134A along substantially the full length of the lower shaft portion 134A. The meltable member 180 also engages the lower surface of the flange 138 and the top surface 132B of the head 130.

The meltable member 180 is formed of a heat-meltable, electrically conductive material. According to some embodiments, the meltable member 180 is formed of metal. According to some embodiments, the meltable member 180 is formed of an electrically conductive metal alloy. According to some embodiments, the meltable member 180 is formed of a metal alloy from the group consisting of aluminum alloy, zinc alloy, and/or tin alloy. However, any suitable electrically conductive metal may be used.

According to some embodiments, the meltable member 180 is selected such that its melting point is greater than a prescribed maximum standard operating temperature. The maximum standard operating temperature may be the greatest temperature expected in the meltable member 180 during normal operation (including handling overvoltage surges within the designed for range of the device 100) but not during operation which, if left unchecked, would result in thermal runaway. According to some embodiments, the meltable member 180 is formed of a material having a melting point in the range of from about 110 to 160° C. and, according to some embodiments, in the range of from about 130 to 150° C. According to some embodiments, the melting point of the meltable member 180 is at least 20° C. less than the melting points of the housing 120, the electrode 130, and the insulator ring 150, according to some embodiments, at least 30° C. less than the melting points of the housing 120, the electrode 130 and the insulator ring 150, and, according to some embodiments, at least 40° C. less than the melting points of the housing 120, the electrode 130 and the insulator ring 150.

According to some embodiments, the meltable member 180 has an electrical conductivity in the range of from about $3\times10^7$ Siemens/meter (S/m) to $4\times10^7$ S/m and, according to some embodiments, in the range of from about $3.5\times10^7$ S/m to $3.8\times10^7$ S/m.

The meltable member 180 can be mounted on the electrode 130 in any suitable manner. According to some embodiments, the meltable member 180 is cast or molded onto the electrode 130. According to some embodiments, the meltable member 180 is mechanically secured onto the electrode 130.

The varistor wafer 110 has first and second opposed, substantially planar contact surfaces 112. The varistor wafer 110 is interposed between the contact surfaces 122A and 132A. As described in more detail below, the head 132 and the wall 122 are mechanically loaded against the varistor wafer 110 to ensure firm and uniform engagement between the surfaces 132A, 122A and the respective opposed surfaces 112 of the varistor wafer 110.

According to some embodiments, the varistor wafer 110 is disk-shaped. However, the varistor wafer 110 may be formed in other shapes. The thickness and the diameter of the varistor wafer 110 will depend on the varistor characteristics desired for the particular application. The varistor wafer 110 may include a wafer of varistor material coated on either side with a conductive coating so that the exposed surfaces of the coatings serve as the contact surfaces. The coatings can be formed of aluminum, copper or silver, for example.

The varistor material may be any suitable material conventionally used for varistors, namely, a material exhibiting a nonlinear resistance characteristic with applied voltage. Preferably, the resistance becomes very low when a prescribed voltage is exceeded. The varistor material may be a doped metal oxide or silicon carbide, for example. Suitable metal oxides include zinc oxide compounds.

The spring washer 140 surrounds the upper shaft portion 134B and engages the upper surface of the flange 138. Each spring washer 140 includes a hole 142 that receives the upper shaft portion 134B of the electrode 130. The spring washer 140 abuts the top face of the flange 138. According to some embodiments, the clearance between the hole 142 and the shaft portion 134B is in the range of from about 0.015 to 0.035 inch. The spring washer 140 may be formed of a resilient material. According to some embodiments and as illustrated, the spring washer 140 is a Belleville washer formed of spring steel. While only one spring washer 140 is shown, more may be used.

The flat metal washer 145 is interposed between the spring washer 140 and the insulator ring 150 with the shaft portion 134B extending through a hole 146 formed in the washer 145. The washer 145 serves to distribute the mechanical load of the spring washer 140 to prevent the spring washer from cutting into the insulator ring 150.

The insulator ring 150 overlies and abuts the washer 145. The insulator ring 150 has a main body ring 154, a cylindrical upper flange or collar 156 extending upwardly from the main body ring 154, and a cylindrical lower flange or collar 158 extending downwardly from the main body ring 154. A hole 152 receives the shaft portion 134B. According to some embodiments, the clearance between the hole 152 and the shaft portion 134B is in range of from about 0.025 to 0.065 inch. The main body ring 154 and the collars 156, 158 may be bonded or integrally molded. An upwardly and outwardly opening peripheral groove 159 is formed in the top corner of the main body ring 154.

The insulator ring 150 is preferably formed of a dielectric or electrically insulating material having high melting and combustion temperatures. The insulator ring 150 may be formed of polycarbonate, ceramic or a high temperature polymer, for example. According to some embodiments, the insulator ring 150 is formed of a material having a melting point greater than the melting point of the meltable member 180.

The end cap 160 overlies and abuts the insulator ring 150. The end cap 160 has a hole 162 that receives the shaft portion 134B. According to some embodiments, the clearance between the hole 162 and the shaft portion 134B is in the range of from about 0.025 to 0.065 inch. The end cap 160 may be formed of aluminum, for example.

The clip 170 is resilient and truncated ring shaped. The clip 170 is partly received in the slot 123 and partly extends radially inwardly from the inner wall of the housing 120 to limit outward axial displacement of the end cap 160. The clip 170 may be formed of spring steel.

The O-ring 172 is positioned in the groove 139A such that it is captured between the flange 138 and the lower collar 158. The O-ring 174 is positioned in the groove 139B such that it is captured between the shaft portion 134B and the upper collar 156. The O-ring 175 is positioned in the groove 159 and captured between the insulator ring 150 and the side wall 124. When installed, the O-rings 172, 174, 175 are compressed so that they are biased against and form a seal between the adjacent interfacing surfaces. In an overvoltage event, byproducts such as hot gases and fragments from the wafer 110 may fill or scatter into the cavity 121. These byproducts may be limited or prevented by the O-rings 172, 174, 175 from escaping the overvoltage protection device 100 along a path between the shaft 134 and the insulator ring 150 or a path between the insulator ring 150 and the side wall 124.

The O-rings 172, 174, 175 may be formed of the same or different materials. According to some embodiments, the O-rings 172, 174, 175 are formed of a resilient material, such as an elastomer. According to some embodiments, the O-rings 172, 174, 175 are formed of rubber. The O-rings 172, 174, 175 may be formed of a fluorocarbon rubber such as VITON™ available from DuPont. Other rubbers such as butyl rubber may also be used. According to some embodiments, the rubber has a durometer of between about 60 and 100 Shore A. According to some embodiments, the melting point of each of the O-rings 172, 174, 175 is greater than the melting point of the meltable member 180.

When assembled as shown in FIG. 3, the housing 120, the wafer 110, the electrode shaft portion 134A, the head 132, the flange 138, and the lower collar 158 define an annular chamber 102, which is a sealed subchamber of the housing cavity 121. The meltable member 180 is contained in the chamber 102.

As noted above and as best shown in FIG. 3, the electrode head 132 and the electrode wall 122 are loaded against the varistor wafer 110 to ensure firm and uniform engagement between the wafer surfaces 112 and the surfaces 122A, 132A. This aspect of the device 100 may be appreciated by considering a method according to the present invention for assembling the device 100. The O-rings 172, 174, 175 are installed in the grooves 139A, 139B, 159. The varistor wafer 110 is placed in the cavity 121 such that the wafer surface 112 engages the contact surface 122A. The electrode 130 is inserted into the cavity 121 such that the contact surface 132A engages the varistor wafer surface 112. The spring washer 140 is slid down the shaft portion 134B and placed over the flange 138. The washer 145, the insulator ring 150, and the end cap 160 are slid down the shaft portion 134B and over the spring washer 140. A jig (not shown) or other suitable device is used to force the end cap 160 down, in turn deflecting the spring washer 140. While the end cap 160 is still under the load of the jig, the clip 170 is compressed and inserted into the slot 123. The clip 170 is then released and allowed to return to its original diameter, whereupon it partly fills the slot and partly extends radially inward into the cavity 121 from the slot 123. The clip 170 and the slot 123 thereby serve to maintain the load on the end cap 160 to partially deflect the spring washer 140. The loading of the end cap 160 onto the insulator ring 150 and from the insulator ring onto the spring washer 140 is in turn transferred to the head 132. In this way, the varistor wafer 110 is sandwiched (clamped) between the head 132 and the electrode wall 122.

As discussed above, in the absence of an overvoltage condition, the varistor wafer 110 provides high resistance such that no current flows through the device 100 as it appears electrically as an open circuit. In the event of an overvoltage condition (relative to the design voltage of the device), the resistance of the varistor wafer decreases rapidly, allowing current to flow through the device 100 and create a shunt path for current flow to protect other components of an associated electrical system. However, certain conditions may cause a build up of heat in the device 100. For example, the device 100 may assume an "end of life" mode in which the varistor wafer is depleted in full or in part (i.e., in an "end of life" state). Also, the device 100 may experience an extended overcurrent event or one or more overcurrent events in close succession. In these cases, the varistor material may be insufficient to conduct the current, causing arcing between the electrode 130 and the housing 120. Likewise, the cross-section of the electrical conduction path may be insufficient for the amount of current, causing high ohmic losses and resultant heat generation. Such arcing may in turn cause a buildup of heat in the device 100. If left unchecked, this buildup of heat may result in thermal runaway and the device temperature may exceed a prescribed maximum temperature. For example, the maximum allowable temperature for the exterior surfaces of the device may be set by code or standard to prevent combustion of adjacent components (e.g., per UL 1449). One way to avoid such thermal runaway is to interrupt the current through the device 100 using a fuse that blows prior to the occurrence of overheat in the device 100. However, as discussed below, in some cases this approach is undesirable as it may cause damage to other important components in an associated circuit or leave the load unprotected after disconnecting the surge protective device.

Figure 4:
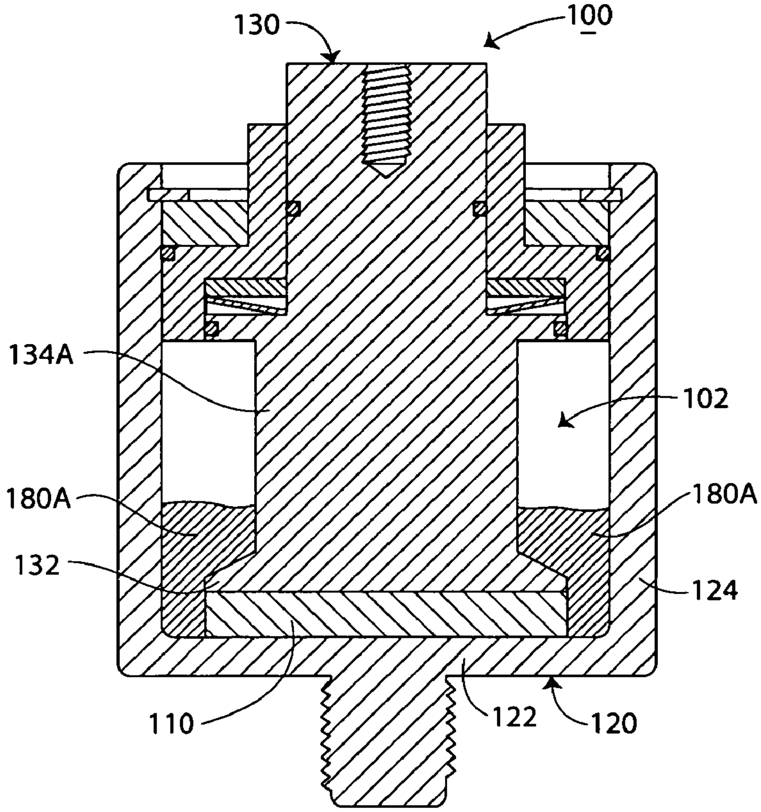
FIG. 4 is a cross-sectional view of the overvoltage protection device of FIG. 1 taken along the line 3-3 of FIG. 2, wherein a meltable member of the overvoltage protection device has been reconfigured by melting in a vertical orientation.
Figure 5:
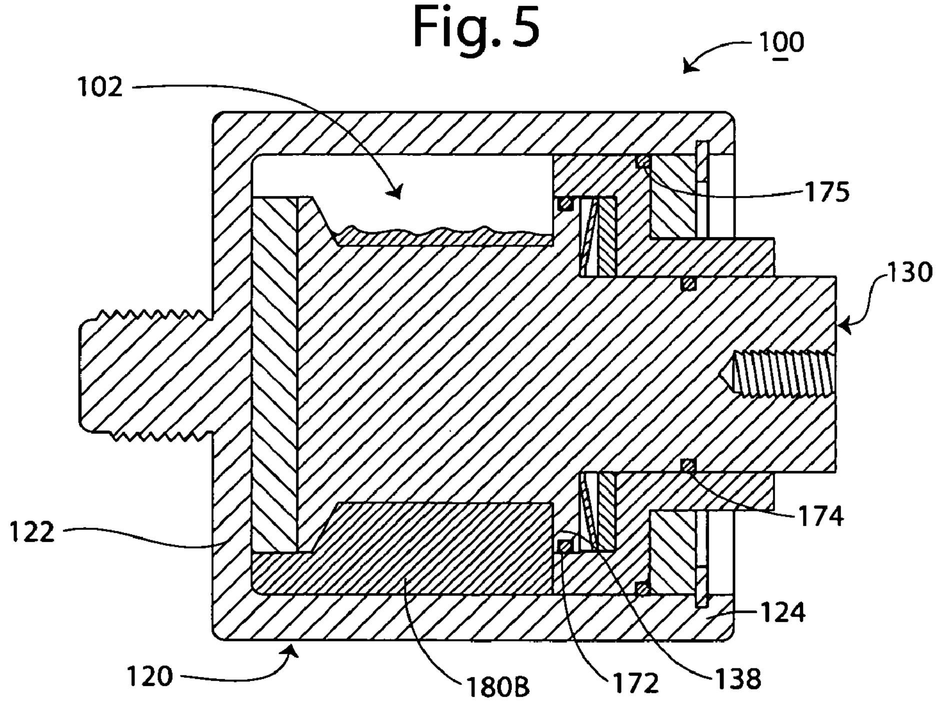
FIG. 5 is a cross-sectional view of the overvoltage protection device of FIG. 1 taken along the line 3-3 of FIG. 2, wherein the meltable member has been reconfigured by melting in a horizontal orientation.

In accordance with embodiments of the present invention, the meltable member 180 serves to prevent or inhibit such thermal runaway without requiring that the current through the device 100 be interrupted. Initially, the meltable member 180 has a first configuration as shown in FIGS. 1 and 3 such that it does not electrically couple the electrode 130 and the housing 120 except through the head 132. Upon the occurrence of a heat buildup event, the electrode 130 is thereby heated. The meltable member 180 is also heated directly and/or by the electrode 130. During normal operation, the temperature in the meltable member 180 remains below its melting point so that the meltable member 180 remains in solid form. However, when the temperature of the meltable member 180 exceeds its melting point, the meltable member 180 melts (in full or in part) and flows by force of gravity into a second configuration different from the first configuration. When the device 100 is vertically oriented, the melted meltable member 180 accumulates in the lower portion of the chamber 102 as a reconfigured meltable member 180A (which may be molten in whole or in part) as shown in FIG. 4. The meltable member 180A bridges or short circuits the electrode 130 to the housing 120. That is, a new direct flow path or paths are provided from the surface of the electrode portion 134A to the surfaces of the housing end wall 122 and the housing side wall 124 through the meltable member 180A. According to some embodiments, at least some of these flow paths do not include the varistor wafer 110.

Thus, the meltable member 180A provides an enlarged electrical contact surface between the electrode 130 and the housing 120 and an enlarged current flow path. That is, the cross-section and volume of the electrical conduction path, which includes the meltable member 180A, are increased. As a result, the arcing, ohmic heating and/or other phenomena inducing heat generation are diminished or eliminated, and thermal runaway and/or excessive overheat of the device 100 can be prevented. The device 100 may thereby convert to a relatively low resistance element capable of maintaining a relatively high current safely (i.e., without catastrophic destruction of the device). It will be appreciated that the device 100 may be rendered unusable thereafter as an overvoltage protection device, but catastrophic destruction (e.g., resulting in combustion temperature, explosion, or release of materials from the device 100) is avoided.

The relatively large diameter of the lower shaft portion 134A positions the outer surface of the shaft portion 134A in closer proximity to the inner surface of the housing side wall 124 and provides greater contact areas between the reconfigured meltable member 180A and the shaft portion 134A and the side wall. According to some embodiments, the diameters of the shaft portions 134A and 134B are sized to carry the surge current without overheating the shaft portions 134A, 134B when the meltable member 180 has melted to form the reconfigured meltable member 180A and the device 100 continues to carry a surge current or non-surge current.

The device 100 may be effectively employed in any orientation. For example, with reference to FIG. 5, the device 100 may be deployed in a horizontal orientation. When the meltable member 180 is melted by an overheat generation event, the meltable member 180 will flow to the lower portion of the chamber 102 where it forms a reconfigured meltable member 180B (which may be molten in whole or in part) that bridges the electrode 130 and the housing 120 as discussed above. The flange 138, the O-ring 172, and the insulator ring lower collar 158 as well as the insulator ring 150, the O-ring 175 and the side wall 124 cooperate to seal the chamber 102 so that the molten meltable member 180 does not flow out of the chamber 102. The O-ring 174 provides a secondary seal.

Figure 6:
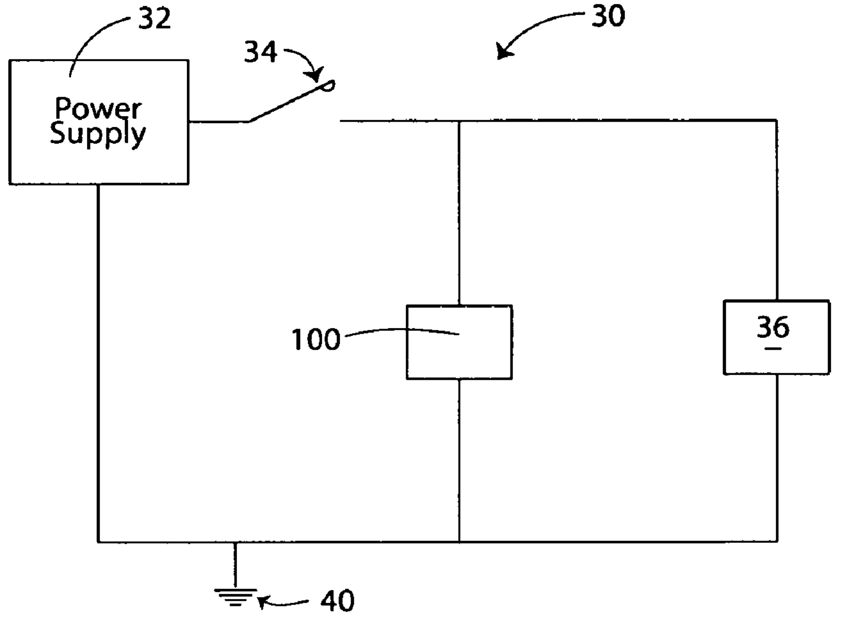
FIG. 6 is a schematic diagram representing a circuit including the overvoltage protection device of FIG. 1 according to embodiments of the present invention.

With reference to FIG. 6, an electrical circuit 30 according to embodiments of the present invention is shown schematically therein. The circuit 30 includes a power supply 32, a circuit breaker 34, a protected load 36, ground 40, and the overvoltage protection device 100. The device 100 may be mounted in an electrical service utility box, for example. The power supply 32 may be an AC or DC supply and provides power to the load 36. The load 36 may be any suitable device, system, equipment or the like (e.g., an electrical appliance, a cellular communications transmission tower, etc.). The device 100 is connected in parallel with the load 36. In normal use, the device 100 will operate as an open circuit so that current is directed to the load 36. In an overvoltage event, the resistance of the varistor wafer will drop rapidly so that overcurrent is prevented from damaging the load 36. The circuit breaker 34 may trip open. However, in some cases, the device 100 may be subjected to a current exceeding the capacity of the varistor wafer 110, causing excessive heat to be generating by arcing, etc. as described above. The meltable member 180 will melt and flow to short circuit the device 100 as discussed above. The short circuiting of the device 100 will in turn trip the circuit breaker 34 to open. In this manner, the load 36 may be protected from a power surge or overcurrent event. Additionally, the device 100 may safely conduct a continuous current.

Notably, the device 100 will continue to short circuit the circuit 30 following the overcurrent event. As a result, the circuit breaker 34 cannot be reset, which notifies an operator that the device 100 must be repaired or replaced. If, alternatively, the branch of the device 100 were interrupted rather than short circuited, the circuit breaker 34 could be closed and the operator may be unaware that the load 36 is no longer protected by a functional overvoltage protection device.

Figure 7:
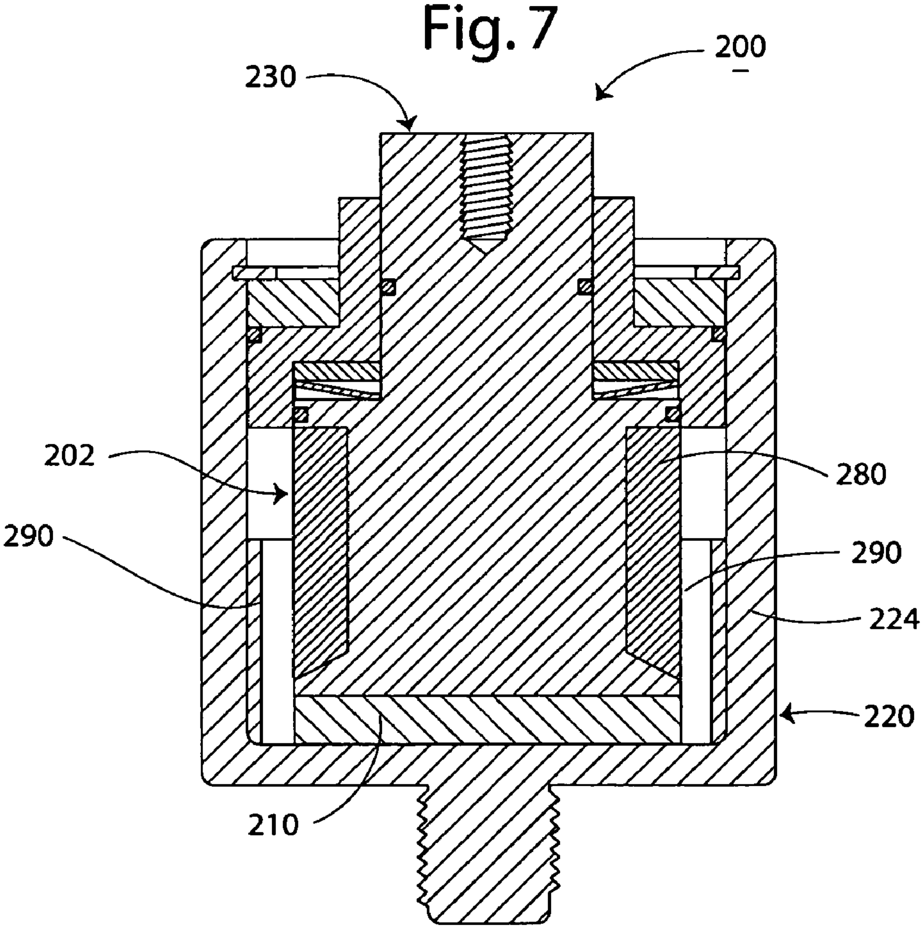
FIG. 7 is a cross-sectional view of a overvoltage protection device according to further embodiments of the present invention.

With reference to FIG. 7, an overvoltage protection device 200 according to further embodiments of the present invention is shown therein. The device 200 corresponds to the device 100 except for the further provision of a liner 290 in the chamber 202. The liner 290 is a tube or sleeve of an electrically and thermally conductive material. According to some embodiments, the liner 290 is formed of a material having a higher melting point than the material of the housing 220. According to some embodiments, the liner 290 is formed of steel and the housing 220 is formed of aluminum. In case of an overcurrent event, some or all of the arcing from the electrode 230 and/or the varistor wafer 210 is directed to the liner 290 rather than the housing 220 itself (and, in particular, the side wall 224). In this way, the liner 290 prevents or delays localized melting of the housing 220 that may puncture the housing 220 or otherwise cause the housing 220 to fail. The liner 290 may also structurally reinforce the housing side wall 224 to provide additional rigidity if the side wall 224 is softened by heat. The liner 290 thereby provides additional time for the meltable member 280 to melt, flow and provide an enlarged current flow path between the electrode 230 and the housing 220.

Figure 8:
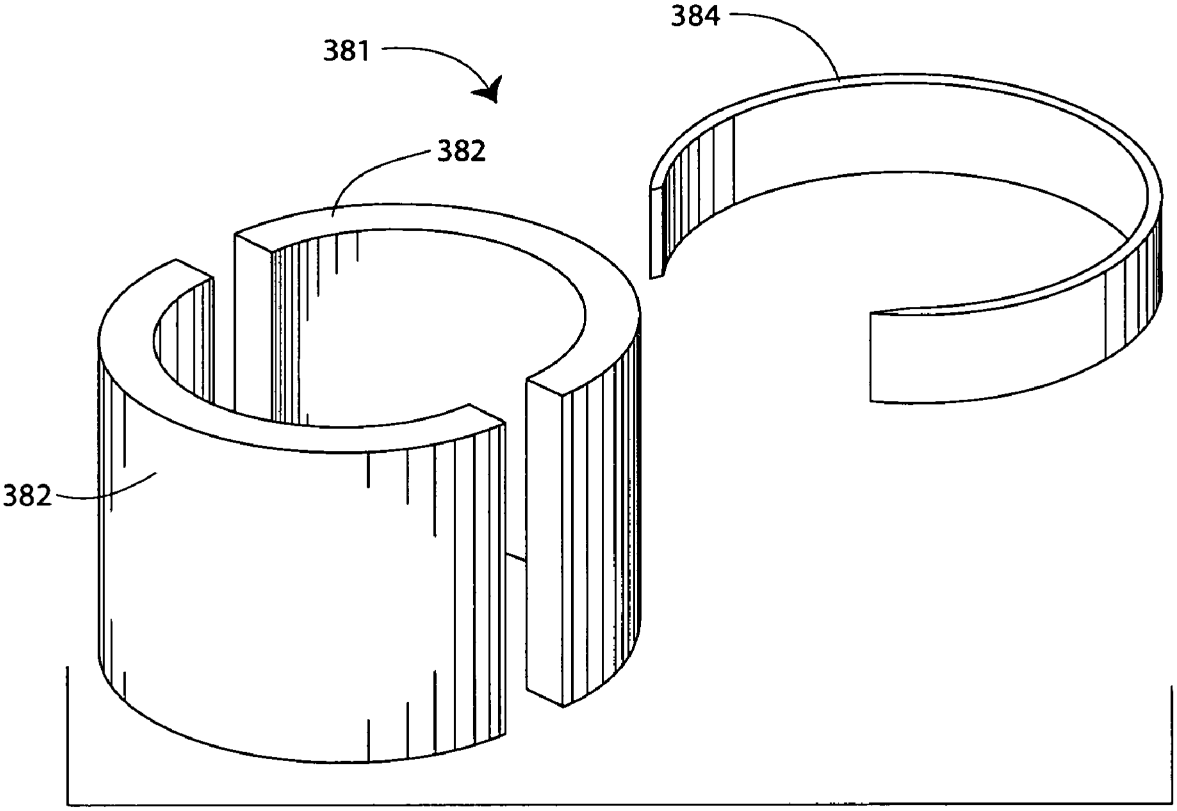
FIG. 8 is an exploded, perspective view of a meltable member assembly according to further embodiments of the present invention.

With reference to FIG. 8, a meltable member assembly 381 according to further embodiments of the present invention is shown therein in exploded perspective view. The meltable member assembly 381 may be used in place of the meltable member 180. The meltable member assembly 381 includes a pair of meltable member subparts 382 and a clamp 384. The subparts 382 can be placed about the electrode lower portion 134A and secured in place using the clamp 384 as a retention device. The subparts 382 may be formed of the materials as discussed above with regard to the meltable member 180. According to some embodiments, circumferential recesses may be formed in the outer surfaces of the subparts 382 to receive the clamp 384 so that the clamp is partially or fully recessed within the subparts 382.

Figure 9:
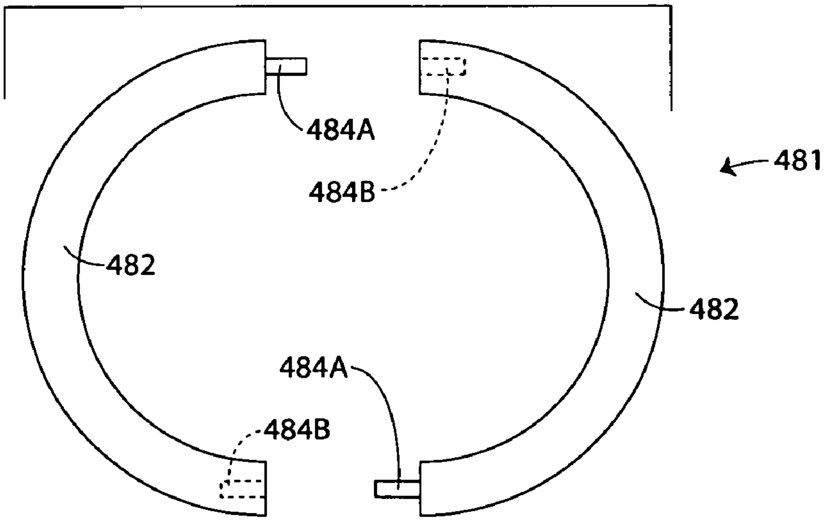
FIG. 9 is an exploded, top view of a meltable member assembly according to further embodiments of the present invention.

With reference to FIG. 9, a meltable member assembly 481 according to further embodiments of the present invention is shown therein. The meltable member assembly 481 may be used in place of the meltable member 180. The meltable member assembly 481 includes a pair of meltable member subparts 482. Each of the subparts 482 has integral retention features in the form of a male projection 484A and a female bore 484B. The subparts 482 can be placed about the electrode lower portion 134A and secured in place by engaging the respective projections 484A and bores 484B. The projections 484A and the bores 484B may be relatively sized and shaped to provide an interference fit. The subparts 482 may be formed of the materials as discussed above with regard to the meltable member 180.

Overvoltage protection devices according to embodiments of the present invention (e.g., the devices 100, 200) may provide a number of advantages in addition to those mentioned above. The devices may be formed so to have a relatively compact form factor. The devices may be retrofittable for installation in place of similar type overvoltage protection devices not having a meltable member as described herein. In particular, the present devices may have the same length dimension, as such previous devices.

According to some embodiments, overvoltage protection devices of the present invention (e.g., the devices 100, 200) are adapted such that when the meltable member is melted to short circuit the overvoltage protection device, the conductivity of the overvoltage protection device is at least as great as the conductivity of the feed and exit cables connected to the device.

According to some embodiments, overvoltage protection devices of the present invention (e.g., the devices 100, 200) are adapted to sustain a current of 1000 amps for at least seven hours without occurrence of a breach of the housing (e.g., the housing 120 or 220) or achieving an external surface temperature in excess of 170° C.

While meltable members or assemblies as described above are mounted so that they surround and are in contact with the electrodes (e.g., the electrode 130), according to other embodiments of the present invention, a meltable member may instead or additionally be mounted elsewhere in a device. For example, a meltable member (e.g., a sleeve or liner of the meltable material) may be mounted on the inner surface of the side wall 124 and/or the underside of the flange 138. Likewise, the meltable member may be shaped differently in accordance with some embodiments of the invention. For example, according to some embodiments, the meltable member is not tubular and/or symmetric with respect to the chamber, the electrode, and/or the housing.

According to some embodiments, the areas of engagement between each of the contact surfaces (e.g., the contact surfaces 122A, 132A) and the varistor wafer surfaces (e.g., the wafer surfaces 112) is at least 0.5 square inches.

According to some embodiments, the combined thermal mass of the housing 120 and the electrode 130 is substantially greater than the thermal mass of the varistor wafer 110. As used herein, the term "thermal mass" means the product of the specific heat of the material or materials of the object (e.g., the varistor wafer 110) multiplied by the mass or masses of the material or materials of the object. That is, the thermal mass is the quantity of energy required to raise one gram of the material or materials of the object by one degree centigrade times the mass or masses of the material or materials in the object. According to some embodiments, the thermal masses of each of the electrode head 132 and the electrode wall 122 are substantially greater than the thermal mass of the varistor wafer 110. According to some embodiments, the thermal masses of each of the electrode head 132 and the electrode wall 122 are at least two times the thermal mass of the varistor wafer 110, and, according to some embodiments, at least ten times as great.

Methods for forming the several components of the overvoltage protection devices of the present invention will be apparent to those of skill in the art in view of the foregoing description. For example, the housing 120, the electrode 130, and the end cap 160 may be formed by machining, casting or impact molding. Each of these elements may be unitarily formed or formed of multiple components fixedly joined, by welding, for example.

Multiple varistor wafers (not shown) may be stacked and sandwiched between the electrode head and the center wall. The outer surfaces of the uppermost and lowermost varistor wafers would serve as the wafer contact surfaces. However, the properties of the varistor wafer are preferably modified by changing the thickness of a single varistor wafer rather than stacking a plurality of varistor wafers.

As discussed above, the spring washer 140 is a Belleville washer. Belleville washers may be used to apply relatively high loading without requiring substantial axial space. However, other types of biasing means may be used in addition to or in place of the Belleville washer or washers. Suitable alternative biasing means include one or more coil springs, wave washers or spiral washers.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. An overvoltage protection device comprising:

a) first and second electrically conductive electrode members;

b) a varistor member formed of a varistor material and electrically connected with each of the first and second electrode members; and c) an electrically conductive, meltable member, wherein the meltable member is responsive to heat in the device to melt and form a current flow path between the first and second electrode members through the meltable member;

wherein the varistor member is adapted to generate heat from ohmic losses in the varistor member when the varistor member is in an end of life mode, and the meltable member is responsive to heat generated from ohmic losses in the varistor member when the varistor member is in its end of life mode to melt and form the new current flow path to prevent catastrophic destruction of the device due to thermal runaway.

2. The device of claim 1 wherein the current flow path formed by the meltable member extends fully from the first electrode member to the second electrode member with the meltable member engaging each of the first and second electrode members.

3. The device of claim 1 wherein the meltable member is formed of metal.

4. The device of claim 3 wherein the meltable member is formed of metal selected from the group consisting of aluminum alloy, zinc alloy, and/or tin alloy.

5. The device of claim 1 wherein the meltable member has a melting point in the range of from about 110° C. to 160°C.

6. The device of claim 1 wherein the first electrode member includes a housing defining a chamber and the meltable member and at least a portion of the second electrode member are disposed in the chamber.

7. The device of claim 6 wherein the meltable member is mounted on the portion of the second electrode member in the chamber.

8. The device of claim 7 wherein the meltable member is cast onto the portion of the second electrode member in the chamber.

9. The device of claim 7 wherein the meltable member includes first and second separate subparts secured to one another on the portion of the second electrode member in the chamber by a retention device.

10. The device of claim 7 wherein the meltable member includes first and second separate subparts secured to one another on the portion of the second electrode member in the chamber by at least one integral retention feature.

11. The device of claim 6 including an electrically conductive reinforcing member separately formed from the varistor member, wherein the reinforcing member is disposed in the chamber between the first and second electrode members, wherein the reinforcing member is formed of a material having a higher melting point than a material of the housing, and wherein the reinforcing member is positioned to receive electrical arcing from the second electrode member.

12. The device of claim 6 wherein the chamber is sealed.

13. The device of claim 6 including an electrically insulating member disposed in the chamber and interposed between the first and second electrode members.

14. The device of claim 6 wherein the housing defines an opening and the second electrode member includes a head positioned in the chamber and a shaft, the device further including:

a metal end cap positioned in the opening and having an end cap hole formed therein, wherein the shaft extends through the end cap hole; and an electrically insulating ring member interposed between the second electrode member and the end cap, the insulating ring member having a ring hole formed therein through which the shaft extends.

15. The device of claim 6 wherein:

the second electrode member includes a head positioned in the chamber, a shaft, and a flange extending from the shaft and spaced apart from the head, wherein the head engages the varistor member and the head and the flange each extend radially outwardly from the shaft;

the meltable member is mounted on the shaft between the head and the flange; and the device further includes a spring washer mounted on the flange opposite the head to apply a load to the head.

16. The device of claim 1 wherein the varistor member is interposed between the first and second electrode members.

17. The device of claim 16 wherein the varistor member is a varistor wafer having opposed wafer surfaces, and each of the first and second electrode members has a contact surface in contact with and biased against a respective one of the wafer surfaces.

18. The device of claim 17 wherein at least one of the first and second electrode members is biased against the wafer surface contacted by it.

19. The device of claim 1 wherein the varistor material is selected from the group consisting of a metal oxide compound and silicon carbide.

20. The device of claim 1 wherein the meltable member has a melting point that is greater than a prescribed maximum standard operating temperature, wherein the prescribed maximum standard operating temperature is the greatest temperature expected in the meltable member during normal operation but not during operation which, if left unchecked, would result in thermal runaway of the device.

21. The device of claim 1 wherein the device includes a housing and is adapted to sustain a current of 1000 amps for at least seven hours without occurrence of a breach in the housing or an external surface temperature on the housing in excess of 170° C.

22. A method for providing overvoltage protection, the method comprising:

providing an overvoltage protection device including:

first and second electrically conductive electrode members;

a varistor member formed of a varistor material and electrically connected with each of the first and second electrode members; and an electrically conductive, meltable member;

directing current through the varistor member responsive to an overvoltage event;

directing current through the varistor member while the varistor member is in an end of life mode such that heat is generated in the varistor member from ohmic losses and;

responsive to the heat in the device from ohmic losses, melting the meltable member to form a new current flow path between the first and second electrode members through the meltable member that inhibits at least some electrically induced heating of the device.

23. The device of claim 22 wherein the varistor member is adapted to generate said heat from ohmic losses in the varistor member when subjected to an extended overcurrent event.

24. The method of claim 22 wherein the current flow path formed by the meltable member extends fully from the first electrode member to the second electrode member with the meltable member engaging each of the first and second electrode members.

25. The method of claim 22 wherein the step of generating said heat in the varistor member from ohmic losses in the varistor member includes subjecting the varistor member to an extended overcurrent event to generate said heat.

26. The method of claim 22 wherein the meltable member has a melting point that is greater than a prescribed maximum standard operating temperature, wherein the prescribed maximum standard operating temperature is the greatest temperature expected in the meltable member during normal operation but not during operation which, if left unchecked, would result in thermal runaway of the device.

27. The method of claim 22 wherein the device includes a housing and is adapted to sustain a current of 1000 amps for at least seven hours without occurrence of a breach in the housing or an external surface temperature on the housing in excess of 170° C.

28. An overvoltage protection device comprising:

a) first and second electrically conductive electrode members;

b) a varistor member formed of a varistor material and electrically connected with each of the first and second electrode members; and c) an electrically conductive, meltable member, wherein the meltable member is responsive to heat in the device to melt and form a new current flow path between the first and second electrode members through the meltable member to inhibit at least some electrically induced heating of the device;

wherein the varistor member is adapted to generate heat from ohmic losses in the varistor member when the varistor member is in an end of life mode and subjected to an extended overcurrent event, and the meltable member is responsive to heat generated from ohmic losses in the varistor member when the varistor member is in its end of life mode and subjected to an extended overcurrent event to melt and form the new current flow path to prevent catastrophic destruction of the device due to thermal runaway; and wherein the meltable member has a melting point that is greater than a prescribed maximum standard operating temperature, wherein the prescribed maximum standard operating temperature is the greatest temperature expected in the meltable member during normal operation but not during operation which, if left unchecked, would result in thermal runaway of the device.

29. The device of claim 28 wherein the device includes a housing and is adapted to sustain a current of 1000 amps for at least seven hours without occurrence of a breach in the housing or an external surface temperature on the housing in excess of 170° C.

30. A method for providing overvoltage protection, the method comprising:

providing an overvoltage protection device including:

first and second electrically conductive electrode members;

a varistor member formed of a varistor material and electrically connected with each of the first and second electrode members; and an electrically conductive, meltable member, wherein the meltable member has a melting point that is greater than a prescribed maximum standard operating temperature, wherein the prescribed maximum standard operating temperature is the greatest temperature expected in the meltable member during normal operation but not during operation which, if left unchecked, would result in thermal runaway of the device;

directing an extended overcurrent through the varistor member while the varistor member is in an end of life mode such that heat is generated in the varistor member from ohmic losses; and responsive to said heat from ohmic losses in the varistor member, melting the meltable member to form a new current flow path between the first and second electrode members through the meltable member that inhibits at least some electrically induced heating of the device.

31. The method of claim 30 wherein the device includes a housing and is adapted to sustain a current of 1000 amps for at least seven hours without occurrence of a breach in the housing or an external surface temperature on the housing in excess of 170° C.

* * * * *

UNITED STATES PATENT AND TRADEMARK OFFICE

CERTIFICATE OF CORRECTION

PATENT NO. : 7,433,169 B2
APPLICATION NO. : 11/301000
DATED : October 7, 2008
INVENTOR(S) : Kamel et al.

It is certified that error appears in the above-identified patent and that said Letters Patent is hereby corrected as shown below:

On the Title Page:
Item 56, References Cited, US Patent Documents:
Please correct US Patent No. “2,158,959” to read --2,158,859--

On the Title Page:
Item 56, Other Publications, Pages 2: Please correct “Raycap “Rayvoss ™ Tramsient Voltage Surge Supprression System””
To read -- Raycap “Rayvoss ™ Transient Voltage Surge Suppression System”--

Signed and Sealed this

Ninth Day of December, 2008

JON W. DUDAS
*Director of the United States Patent and Trademark Office*